(12) United States Patent
Cheney et al.

(10) Patent No.: US 6,519,283 B1
(45) Date of Patent: Feb. 11, 2003

(54) INTEGRATED VIDEO PROCESSING SYSTEM HAVING MULTIPLE VIDEO SOURCES AND IMPLEMENTING PICTURE-IN-PICTURE WITH ON-SCREEN DISPLAY GRAPHICS

(75) Inventors: Dennis P. Cheney, Vestal; Lawrence D. Curley, Endwell, both of NY (US); William R. Lee; Leland D. Richardson, both of Apex, NC (US); Ronald S. Svec, Berkshire, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/328,756

(22) Filed: Jun. 9, 1999

Related U.S. Application Data

(63) Continuation-in-part of application No. 09/237,601, filed on Jan. 25, 1999.

(51) Int. Cl.[7] .................................................. H04B 1/66
(52) U.S. Cl. ................... 375/240.01; 348/568; 725/139
(58) Field of Search ....................... 348/568; 375/240.01, 375/240.05, 240.2; 725/139; H04V 5/445

(56) References Cited

U.S. PATENT DOCUMENTS

| | | | |
|---|---|---|---|
| 5,045,946 A | 9/1991 | Yu ............................... | 348/565 |
| 5,208,660 A | 5/1993 | Yoshida ....................... | 348/567 |
| 5,539,451 A | 7/1996 | Carey et al. ................. | 725/139 |
| 5,553,140 A | 9/1996 | Kubota et al. ............... | 380/210 |
| 5,576,765 A | 11/1996 | Cheney et al. ......... | 375/240.02 |
| 5,585,837 A | 12/1996 | Nixon ........................... | 725/78 |
| 5,614,957 A * | 3/1997 | Boyce et al. ................ | 348/568 |
| 5,644,364 A | 7/1997 | Kurtze et al. ................ | 348/584 |
| 5,726,715 A | 3/1998 | Endress ....................... | 348/565 |
| 5,734,442 A | 3/1998 | Machado ..................... | 348/705 |
| 5,838,385 A * | 11/1998 | Reder et al. ................. | 348/568 |
| 6,011,594 A * | 1/2000 | Takashima ................... | 348/568 |
| 6,141,062 A | 10/2000 | Hall et al. .................... | 348/584 |

FOREIGN PATENT DOCUMENTS

| | | | |
|---|---|---|---|
| CA | 2023498 | 1/1995 | ......... H04N/007/12 |
| CA | 2241457 | 10/2001 | ............ H04N/7/01 |

* cited by examiner

*Primary Examiner*—Howard Britton
(74) *Attorney, Agent, or Firm*—William H. Steinberg, Esq.; Kevin P. Radigan, Esq.; Heslin Rothenberg Farley & Mesiti P.C.

(57) ABSTRACT

An integrated digital video system is configured to implement picture-in-picture merging of video signals from two or more video sources, as well as selective overlaying of on-screen display graphics onto the resultant merged signal. The picture-in-picture signal is produced for display by a television system otherwise lacking picture-in-picture capability. The digital video system can be implemented, for example, as an integrated decode system within a digital video set-top box or a digital video disc player. In one implementation, a decompressed digital video signal is downscaled and merged with an uncompressed video signal to produce the multi-screen display. The uncompressed video signal can comprise either analog or digital video. OSD graphics can be combined within the integrated system with the resultant multi-screen display or only with a received uncompressed analog video signal.

21 Claims, 10 Drawing Sheets

| PICTURE TYPE | SM CURRENT POINTER | SM DISPLAY POINTER | SM FUTURE POINTER | SM TRANSITION POINTER |
|---|---|---|---|---|
| RESET | 0 | 2 | 4 | 6 |
| I | 6 | 4 | 6 | 2 |
| P | 2 | 6 | 2 | 4 |
| B | 4 | 4 | 2 | 6 |
| B | 6 | 6 | 2 | 4 |
| P | 4 | 2 | 4 | 6 |
| B | 6 | 6 | 4 | 2 |
| P | 2 | 4 | 2 | 6 |
| P | 6 | 2 | 6 | 4 | fig. 7B

INTEGRATED VIDEO PROCESSING SYSTEM HAVING MULTIPLE VIDEO SOURCES AND IMPLEMENTING PICTURE-IN-PICTURE WITH ON-SCREEN DISPLAY GRAPHICS

CROSS-REFERENCE TO RELATED APPLICATIONS AND PATENT

This application comprises a continuation-in-part patent application from commonly assigned, co-pending patent application Ser. No. 09/237,601, filed Jan 25, 1999, Campisano et al. entitled "MPEG Video Decoder With Integrated Scaling And Display Functions," which is hereby incorporated herein by reference in its entirety.

This application also contains subject matter which is related to the subject matter of the following U.S. patent applications and Letters Patent, which are assigned to the same assignee of this application. Each of the below-listed applications and Letters Patent is hereby incorporated herein by reference:

"Programmable External Graphics/Video Port For Digital Video Decode System Chip," by Cheney et al., Ser. No. 09/328,757, filed June 9, 1999;

"Anti-Flicker Logic For MPEG Video Decoder With Integrated Scaling And Display Functions," by D. Hrusecky, Ser. No. 09/237,600;

"Color Mapped And Direct Color OSD Region Processor With Support For 4:2:2 Profile Decode Function," by Hrusecky et al., Ser. No. 09/094,753; and "Video Decoder,", by.Cheney et al., U.S. Pat. No. 5,576,765.

TECHNICAL FIELD

The present invention is directed generally to video signal processing, and more particularly, to an integrated digital video processing system capable of receiving and merging a compressed digital video signal and an uncompressed analog video signal into a picture-in-picture display for a television system, either with or without overlaying of on-screen display graphics. By way of example, the integrated digital video processing system can be implemented as a digital video set-top box (STB). or a digital video disc (DVD) player.

BACKGROUND OF THE INVENTION

Multiple functions are today commonly being integrated onto a single system chip. For example, in order to enhance marketability of an integrated digital video processing system chip, such as a digital video system chip for use in a set-top box or digital video disc player, it may be desirable to allow for external inputs or functions to be coupled to the integrated system chip.

In general, a picture-in-picture television system displays a certain picture as a main screen and a given number of sub-screens, which have the same image source with one another, arranged at predetermined positions on the main screen. Conventionally, a television system either includes a picture-in-picture module or not, in which case the television system comprises a non-picture-in-picture system. The picture-in-picture feature of television systems typically differentiates a high-end television system from a low-end television system. Systems offering picture-in-picture often carry a significant additional charge over a similar television without picture-in-picture.

Recognized herein is the commercial desirability of adding a picture-in-picture feature to an integrated digital video system, such as a digital video decode set-top box or digital video disc player, with a minimal of additional product cost, to thereby provide a non-picture-in-picture television system with the capability of displaying multiple pictures simultaneously.

DISCLOSURE OF THE INVENTION

Briefly summarized, the invention comprises in one aspect a method for forming a multi-screen display for presentation to a non-picture-in-picture television system. The method includes: receiving and decoding a compressed digital video signal to produce a decompressed digital video signal; receiving an uncompressed video signal; and merging the decompressed digital video signal and uncompressed video signal to produce a multi-screen display signal for the television system, thereby providing the non-picture-in-picture television system with the capability to display multiple screens simultaneously.

In another aspect, a method for processing an analog video signal is provided herein. This method includes: digitizing the analog video signal for input to a digital video processing system; and blending within the digital video processing system the digitized video signal with on-screen display (OSD) graphics.

In still another aspect, a system for forming a multi-screen display for a non-picture-in-picture television system is provided. This system includes a video decoder for decoding a compressed digital video signal from a first video source and producing therefrom a decompressed digital video signal. The system further includes an input for receiving into the video decoder an uncompressed video signal from a second video source. The video decoder is adapted to merge the decompressed digital video signal and the uncompressed video signal to produce a multi-screen display signal for the television system, thereby providing the non-picture-in-picture television system with the capability to display multiple screens simultaneously.

In yet another aspect, a system for processing an analog video signal is provided. This system includes a digital video processing system, and a digital multi-standard decoder. The digital multi-standard decoder digitizes the analog video signal for input to the digital video processing system. The digital video processing system is adapted to blend the digitized video signal with on-screen display (OSD) graphics for output as a blended video signal.

In a further aspect, the present invention provides an article of manufacture which includes a computer program product having computer usable medium with computer readable program code means therein for forming a multi-screen display for a non-picture-in-picture television system. The computer readable program code means in the computer program product includes: computer readable program code means for causing a computer to effect decoding a compressed digital video signal to produce a decompressed digital video signal; computer readable program code means for causing a computer to effect receiving an uncompressed video signal; and computer readable program code means for causing a computer to effect merging the decompressed digital video signal and uncompressed video signal to produce a multi-screen display signal for the television system, thereby providing the non-picture-in-picture television system with the capability to display multiple pictures simultaneously.

In a-still further aspect, the invention comprises an article of manufacture which includes a computer program product having computer usable medium with computer readable program code means therein for processing an analog video signal. The computer readable program code means in the computer program product includes: computer readable program code means for causing a computer to effect digitizing the analog video signal; and computer readable program code means for causing a computer to effect blending the digitized video signal with on-screen display (OSD) graphics for presentation to a television system.

To restate, provided herein is an integrated digital video processing system capable in one embodiment of receiving and merging a compressed digital video signal and an uncompressed analog video signal into a picture-in-picture display for a television system otherwise lacking picture-in-picture capabilities. As an enhancement, the picture-in-picture display produced by the integrated digital video processing system can be overlaid with on-screen display (OSD) graphics. In an alternate embodiment, an integrated digital video processing system is provided wherein an analog video signal can be received and overlaid with OSD graphics before presentation to a television system for display.

The integrated digital video processing system can be implemented as a digital video set-top box (STB) or a digital video disc (DVD) player, by way of example. Pursuant to this invention, picture-in-picture capabilities, as well as OSD graphics overlay capabilities can be added through a set-top box controller chip with a very minimum of additional product cost. The uncompressed analog video forming a portion of the resultant picture-in-picture can be derived from any one of a number of sources, including a video cassette recorder, camcorder, television camera, laser disc, DVD player, computer with TV output, cable television signal, satellite analog channel, or a tuner-connected antenna. Advantageously, in one embodiment of the invention presented herein, the mixing/blending of uncompressed video and decompressed video is performed at a last stage of video processing for a video decoder, and therefore, logic necessary to provide the video decompression and on-screen display is free to continue the video decompression display refresh and video downscaling.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 7b illustrates one example of switching of the small frame buffers 2, 4 & 6 of FIG. 6a in accordance with the present invention;

BEST MODE FOR CARRYING OUT THE INVENTION

Figure 1:
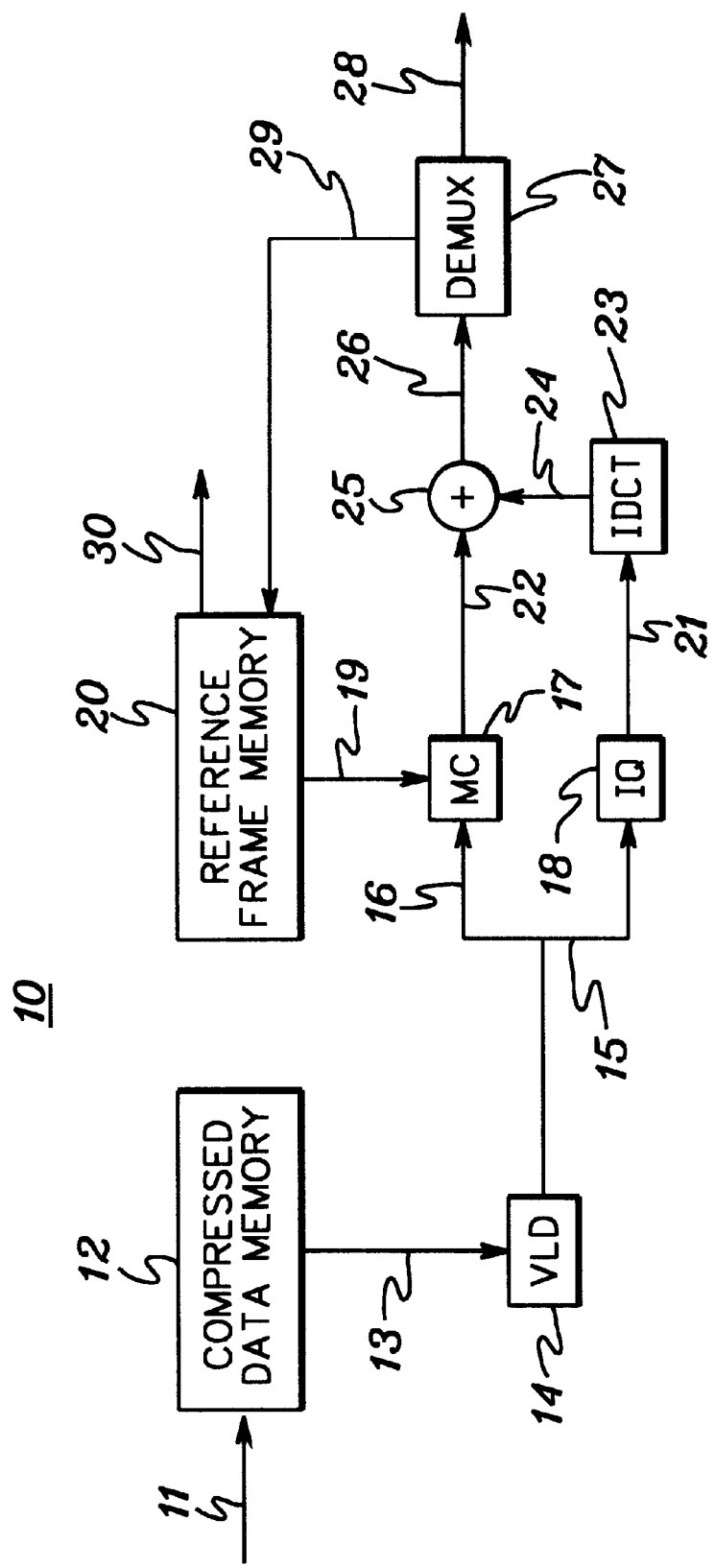
FIG. 1 depicts a general block diagram of a video decode unit.

Generally stated, presented herein is an integrated digital video decode system, for example, for a digital video set-top box (STB) or a digital video disc (DVD) player, which provides picture-in-picture capability to a non-picture-in-picture television system. Further presented herein is an integrated digital video processing system capable of blending on-screen display graphics with an uncompressed analog input signal from, for example, a cable, satellite, video cassette recorder, or external tuner, as well as the capability to blend OSD graphics with a composite multi-screen display produced by the integrated digital video decode system.

Input of an analog (or secondary digital) video stream can be through, for example, an external graphics/video (EGV) port such as described in the above-incorporated, co-filed patent application entitled "Programmable External Graphics/Video Port For Digital Video Decode System Chip". Briefly summarized, the EGV port comprises a programmable bi-directional port for a video decode system chip having a video decoder and an internal digital display generator circuit. The EGV port employs a fixed number of signal input/output (I/O) pins on a video decode system chip while providing a plurality of connection configurations for an external graphics controller, an external digital display generator circuit and an external digital multi-standard decoder to the video decoder or the internal digital display generator circuit of the chip. The EGV port includes receiver/driver circuitry for accommodating in parallel a plurality of input/output signals, including pixel data signals and corresponding synchronization signals.

Further, the above-incorporated patent application entitled "MPEG Video Decoder With Integrated Scaling And Display Functions" can be referenced for one embodiment for producing a reduced size, decompressed video signal for display, for example, on a conventional television system. Downscaling of decompressed video is discussed in detail below in connection with FIGS. 6–10. One embodiment of an OSD region processor is described in detail in the application entitled "Color Mapped And Direct Color OSD Region Processor With Support For 4:2:2 Profile Decode Function," and OSD overlaying of graphics is a capability that is commercially available as noted further below. In one embodiment, the capabilities described in these applications are incorporated into an integrated digital video decode system to be employed in accordance with the principles of the present invention. However, the teachings of these applications are incorporated by way of example only. Other approaches will be apparent to those skilled in the art based upon the description provided herein.

As is well-known, the MPEG-2 standard describes a digital video encoding method that results in substantial bandwidth reduction by a subjective lossy compression followed by a lossless compression. Encoded, compressed digital data is subsequently decompressed and decoded in an MPEG-2 decoder By way of example, video decoding in accordance with the MPEG-2 standard is described in detail in the above-incorporated, commonly assigned U.S. Pat. No. 5,576,765, entitled "Video Decoder".

Although the present invention is described hereinbelow in connection with an MPEG-2 video decoder, such as discussed in U.S. Pat. No. 5,576,765, the invention is not limited to use with an MPEG-2 decoder, but rather, can be employed within any integrated video processing system where it is desirable to implement enhanced graphics and/or video processing.

As background, FIG. 1 shows a diagram of a conventional video decoder. Compressed data enters as signal 11 and is stored in the compressed data memory 12. The variable length decoder (VLD) 14 reads the compressed data as signal 13 and sends motion compensation information as signal 16 to the motion compensation (MC) unit 17 and quantized coefficients as signal 15 to the inverse quantization (IQ) unit 18. The motion compensation unit reads the reference data from the reference frame memory 20 as signal 19 to form the predicted macroblock, which is sent as signal 22 to the adder 25. The inverse quantization unit computes the unquantized coefficients, which are sent as signal 21 to the inverse transform (IDCT) unit 23. The inverse transform unit computes the reconstructed difference macroblock as the inverse transform of the unquantized coefficients. The reconstructed difference macroblock is sent as signal 24 to the adder 25, where it is added to the predicted macroblock. The adder 25 computes the reconstructed macroblock as the sum of the reconstructed difference macroblock and the predicted macroblock. The reconstructed macroblock is then sent as signal 26 to the demultiplexer 27, which stores the reconstructed macroblock as signal 29 to the reference memory if the macroblock comes from a reference picture or sends it out (to memory or display) as signal 28. Reference frames are sent out as signal 30 from the reference frame memory.

Figure 2:
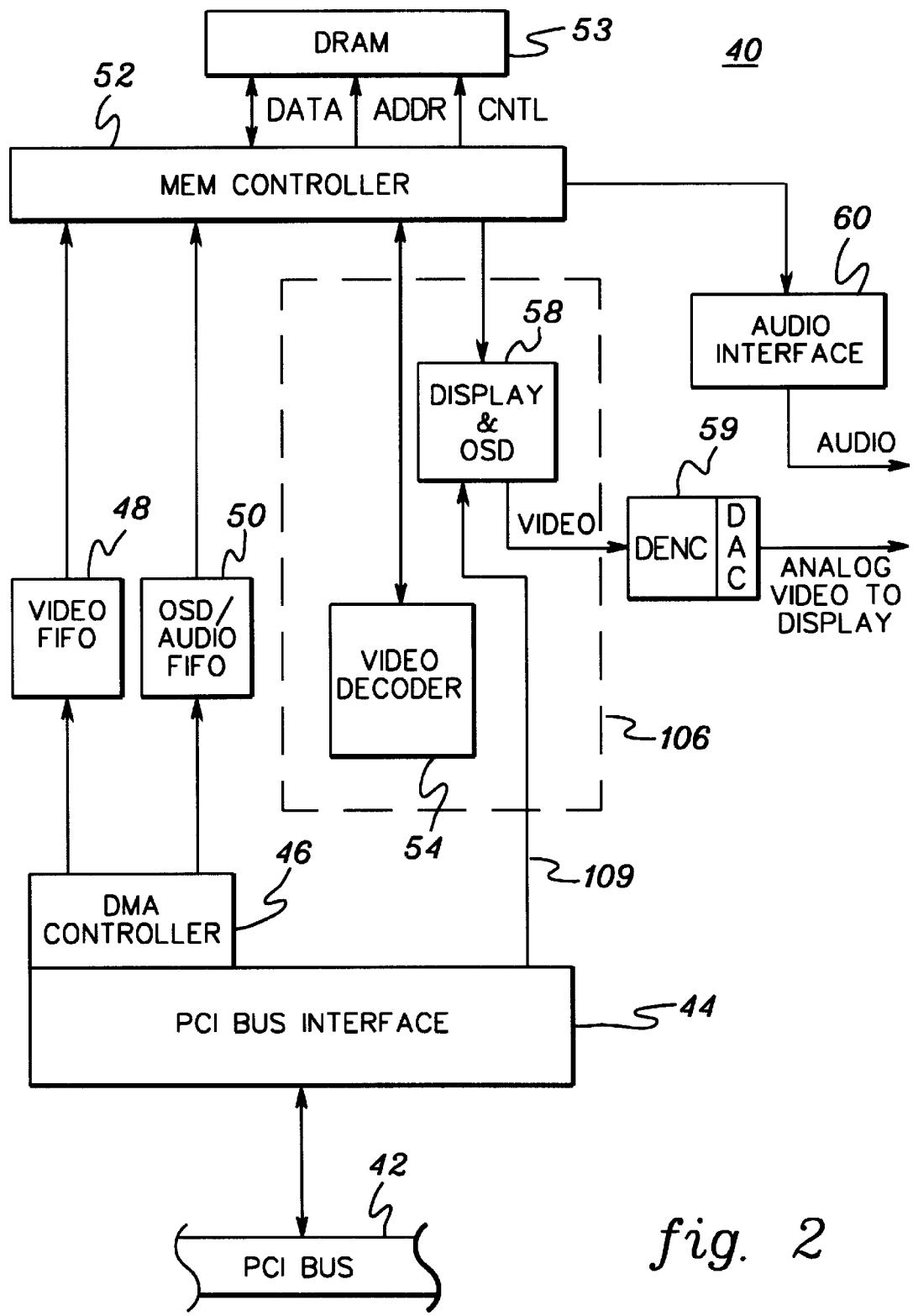
FIG. 2 is a block diagram of a video decode system to implement picture-in-picture with on-screen display (OSD) graphics capabilities in accordance with the principles of the present invention.

A partial embodiment of a decode system chip, generally denoted 40, to employ the concepts of the present invention is depicted in FIG. 2. System 40 includes, e.g., a PCI bus interface 44 which couples the decode system 40 to a PCI bus 42. MPEG encoded video data is fetched from PCI bus 42 by a DMA controller 46 which writes the data to a video first-in/first-out (FIFO) buffer 48. The DMA controller also fetches on-screen display (OSD) and/or audio data from PCI bus 42 for writing to an OSD/audio FIFO 50. A memory controller 52 will place video data into a correct memory buffer within dynamic random access memory (DRAM) 53. MPEG compressed video data is then retrieved by the video decoder 54 from DRAM 53 and decoded as described above in connection with FIG. 1. Conventionally, the decoded video data is then stored back into the frame buffers of DRAM 53 for subsequent use. When a reference frame is needed, or when video data is to be output from the decode system, stored data in DRAM 53 is retrieved by the MEM controller and forwarded for output via a display & OSD interface 58 through a digital video encoder/digital-to-analog converter chip 59. Audio data, also retrieved by the video controller 52, is output through an audio interface 60.

As noted briefly above, this invention is directed in one aspect to providing a digital video decode system with the ability to implement a picture-in-picture feature. Another aspect of the invention is directed to providing a digital video decode system with the capability to overlay graphics onto an analog video signal that is input to a digital video processing system, through, for example, an external graphics/video (EGV) port such as described in the above-incorporated, co-filed patent application entitled "Programmable External Graphics/Video Port For Digital Video Decode System Chip." This invention employs two features of the integrated digital video decode systems described in the initially incorporated applications. Specifically, this invention employs the previously described ability to blend on-screen display (OSD) graphics with an analog video channel, as well as the ability to downscale decompressed digital video to a region comprising a portion of the full screen size. These features are described in greater detail below and in the incorporated applications.

Figures 3, 4, 5:
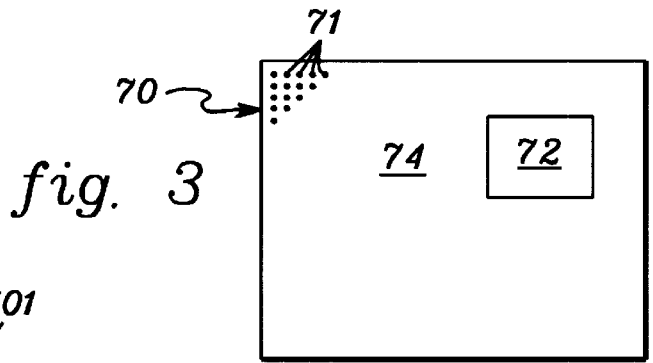
FIG. 3 is a block diagram representation of a multi-screen display (i.e., picture-in-picture) implemented in accordance with the principles of the present invention.
FIG. 4 is a block diagram of one embodiment of an integrated video decode system in accordance with the present invention, having a first, digital video source and a second, analog video source inputting video signals for merging within the integrated system.
FIG. 5 is a detailed representation of one technique for merging decompressed digital video and uncompressed analog video into a multi-screen display, along with the capability to blend the resultant video with on-screen display (OSD) graphics in accordance with the principles of the present invention.

FIG. 3 depicts one embodiment of a display screen 70 of a television system to display images produced by an integrated digital video decode system in accordance with the principles of the present invention. As is well-known, screen 70 displays images through a plurality of pixels 71 extending across the screen. Within screen 70, a first picture 72 is shown disposed within a larger picture 74. Thus, FIG. 3 is an example of a picture-in-picture or multi-screen display.

FIG. 4 depicts one embodiment of a digital video decode system chip, generally denoted 100, incorporating the principles of the present invention. System 100 receives a digital video signal 101, for example, from a first video source such as a cable or satellite source. Signal 101 is forwarded through a network interface module (NIM) 102, which outputs an MPEG transport stream to transport logic 103 comprising part of the integrated system 100. Transport 103 demultiplexes the transport stream and sends the compressed video stream to a video decoder 106 (see. FIG. 2) within the integrated system. The video decoder generates a decompressed MPEG video signal which is ultimately forwarded to an internal digital video encoder (DENC) macro 107 for formatting for a television system (not shown). Digital-to-analog conversion of the video signal occurs prior to output 110 to the television system.

In accordance with the principles of the present invention, the downscaling capabilities of the video decoder 106 (described in detail below relative to FIGS. 6–10) are employed to reduce the size of the decompressed digital video, in one embodiment, to a fractional picture display size, for presentation as a secondary window, such as window 72 in FIG. 3. The other picture to form the picture-in-picture display is received as an uncompressed video signal through, for example, the external graphics/video port described in the above-incorporated application entitled "Programmable External Graphics/Video Port For Digital Video Decode System Chip." Alternatively, a dedicated port could be constructed by one skilled in the art for input of the uncompressed video signal to the integrated digital processing system, including the video decoder. This uncompressed signal is received from a second video source and may either comprise another digital signal or an analog signal.

If an analog video signal 104 is received, for example, from a cable, satellite, VCR or tuner source, a digital multi-standard decoder (DMSD) 105 digitizes the analog signal for input to the integrated digital video decode system 100. Interfacing of the DMSD 105 to the video decoder and associated display and OSD logic 106 is described in the above-incorporated EGV port application. Note that DMSD 105, along with providing digital conversion of the analog video signal, will be (in one embodiment) the sync master to the video decoder and internal DENC. DMSD 105 provides synchronization signals, for example, via horizontal sync and vertical sync input ports, CCIR-656 SAV/EAV code words, or similar means, to both the video decoder's display/OSD unit and the internal DENC. The latter two units are responsible for interpreting the synchronization information and correctly processing the data. The means for performing this can be standard operations, for example, employing sync slave signals.

FIG. 5 depicts one embodiment for modifying the video decoder/display & OSD logic 106 to include the merging and blending capabilities pursuant to the present invention. In this embodiment, a 2:1 MUX 202 controlled by a processor generated "pixel select control" signal selects between the decompressed digital video, i.e., the decompressed video derived from the MPEG stream received through transport 103, or the uncompressed video, i.e., the analog (or digital) signal received through DMSD 105. In one embodiment, the "pixel select control" has three modes of operation which are set by the host processor. The host processor can set the pixel select control to (1) forward the decompressed video on to display, (2) forward the uncompressed video on to display or (3) support picture-in-picture display, dynamically selecting both the decompressed and uncompressed video for display. In mode (3), switching between decompressed and uncompressed video for simultaneous display is done at a rate according to the desired location(s) of the secondary picture 72 (see FIG. 3).

In one embodiment, the decompressed digital video is downscaled to form a window within a larger picture comprising the uncompressed video. Thus, the "pixel select control" signal dictates from an upper leftmost position on the display screen whether pixel information from the decompressed video or the uncompressed video is to be employed progressing from left to right in a raster scan line and from top to bottom down the display screen. In this regard, note that the positioning of the insert picture as well as the size of the insert picture can be readily modified by those skilled in the art without departing from the teachings of the present invention. The resultant video output from 2:1 MUX 202 is fed as the base input to OSD blend logic 204 on the integrated digital video decode system chip 100 (FIG. 4). The OSD graphics to be blended with the resultant video is also input to logic 204, the output of which is the desired picture-in-picture with graphics. The functioning of the OSD blend logic 204 is identical to that already known in connection with superimposing OSD graphics over decompressed digital video alone.

The OSD blend function provides a weighted average of pixel luma and chroma values between the video and OSD graphics source. This average is based on a weighting coefficient alpha (denoted here by 'a') having a range between 0 and 1. The average is calculated as:

(video×a)+(OSD×(1−a)).

Additionally, most implementations provide for the OSD graphics area to be composed of one or more regions (rectangles), with the alpha coefficient individually selectable for each region (i.e., blending does not have to be constant over the entire OSD). The OSD blending function for use with decompressed digital video is available in the art in products such as IBM's "MPEG 2CS22 Digital Audio/Video Decoder".

To summarize, the co-filed, and incorporated EGV port patent application describes a capability to bring into an integrated digital video decode system (such as a set-top box or digital video disc player) an uncompressed video stream and synchronize the output video/audio presentation to the stream. Presented herein is the further capability to mix and/or blend graphics into the output video stream, which may either comprise the uncompressed video stream or a merged picture-in-picture video stream including both the decompressed digital video and the uncompressed video. The blended stream is then output to the internal digital video encoder (DENC) macro for encoding to television format. Thus, an uncompressed (e.g., analog) channel is presented with the same graphical features, function and programming model capabilities as existing digital channels utilizing the integrated digital decode system. Typical sources for the uncompressed, analog video would be a video cassette recorder (VCR), camcorder, television camera, laser disc, digital video disc player, computer with TV output, cable television analog channel, satellite analog channel, tuner connected antenna (broadcast). Any of these sources may provide a composite television or S-video signal to a digital multi-standard decoder (DMSD) chip which then digitizes the incoming video and sends the digitized video to the integrated decode system for blending of video signals and mixing of graphics.

As noted briefly above, downscaling of decoded digital video is also employed in a preferred embodiment hereof wherein a stream of picture-in-picture video is produced for display on a conventional, non-picture-in-picture television system. Downscaling of the digital decompressed video has been described in the above-incorporated co-pending applications as freeing up television display surface area for graphics information that the viewer is temporarily more interested in viewing. The graphics information may be Internet information, programming guide information or any adjustments to the audio or video presentation. The downscaled video can be placed in various locations of the screen.

Because the mixing/blending of uncompressed video described herein is performed as a last stage in the video processing (see FIG. 2) all logic necessary to provide the video decompression and on-screen display is free to continue the video decompression, display refresh and video downscaling. The mix/blend is proposed herein to be performed between the OSD graphics and the decompressed digital video or the uncompressed analog video. By providing controls to the selection of the video source that dynamically switch between the reduced picture decompressed digital video and the uncompressed video source, a full screen uncompressed video is presented in the background and the reduced digital video is presented in the foreground. Positioning of the foreground video can be moved under software and user control to keep the reduced image from blocking the significant sections of the full-screen video image stream. OSD graphics can be blended with both images to cover the entire viewing area. OSD graphics can, be used to put a border around the reduced foreground image as desired.

As discussed initially herein, this invention comprises a decoding system with integrated scaling capability which can scale the size of an MPEG-2 video presentation by a predetermined reduction factor. As the MPEG-2 video decoder market becomes more and more competitive, the need for high level of feature integration at the lowest possible cost is important to achieving success in the marketplace. The present invention acknowledges this by providing a scaling mode to reduce the size of a display picture by a predefined factor, such as 2 and/or 4 in both the horizontal and vertical axis.

Figure 6:
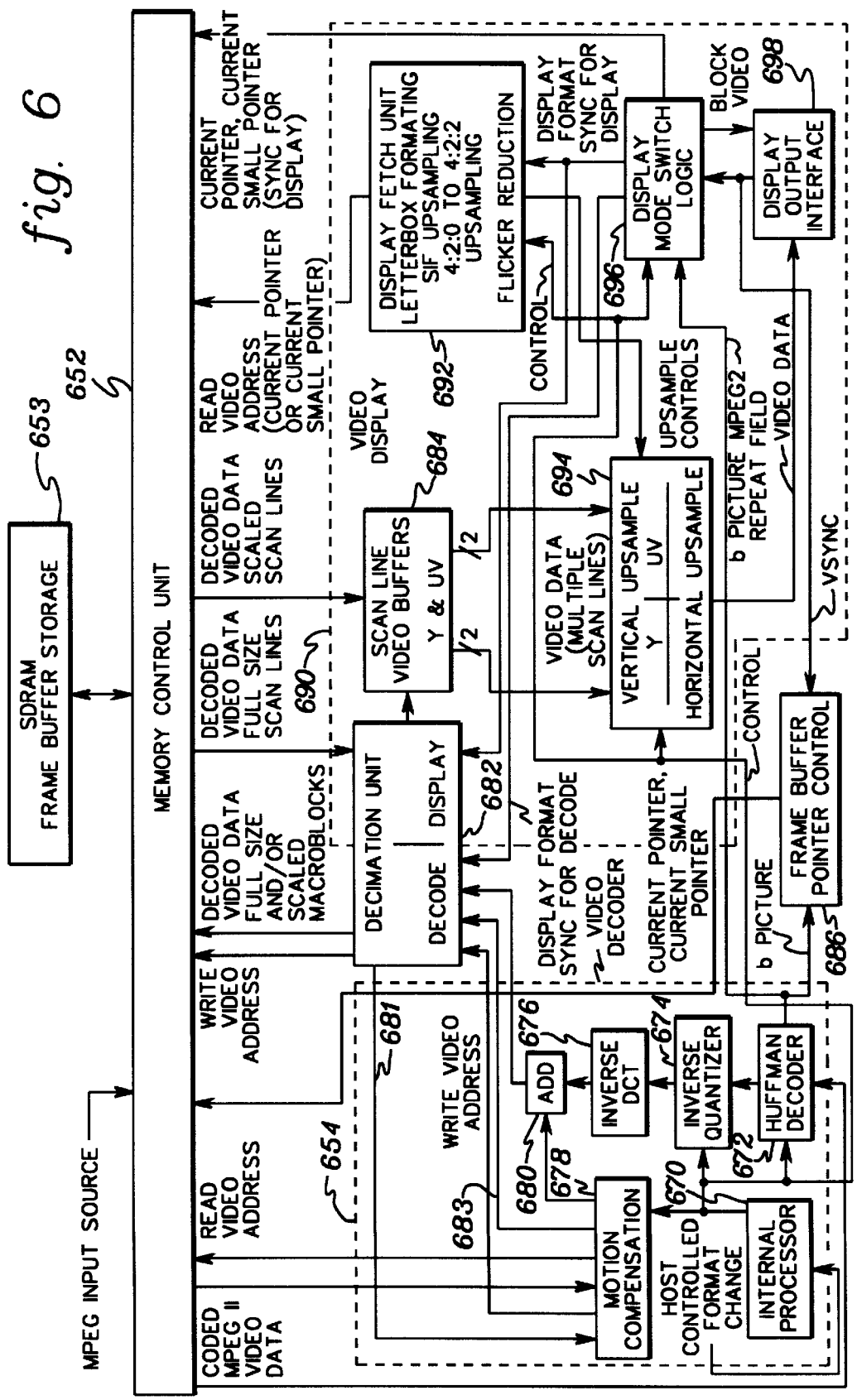
FIG. 6 is a detailed embodiment of a video decoding system in accordance with the principles of the present invention.

FIG. 6 depicts one embodiment of a video decode system in accordance with the principles of the present invention. This video decode system includes external memory 653, which in the embodiment shown comprises SDRAM frame buffer storage. Memory 653 interfaces with a memory control unit 652. Memory control unit 652 receives decoded video data from a video decoder 654 and provides video data for display through video display unit 690. In accordance with the principles of the present invention, the video decode system includes numerous features which implement a video scaling mode capability.

For example, decimation unit 682 is modified to include both a normal video decimation mode and a video scaling mode. Frame buffers 653 are modified to accommodate storage of decoded video data in either full-frame format or a combination of full-frame format and scaled video format. Display mode switch logic 696 is provided within video display unit 690 to facilitate seamless switching between normal video mode and scaled video mode. Frame buffer pointer control 686 is modified to provide the correct frame buffer pointers based on the novel partitioning of the frame buffers when in normal video mode and when in scaled video mode.

Operationally, an MPEG input video source is fed through memory control unit 652 as coded MPEG-2 video data to the input of video decoder 654. Decoder 654 includes a Huffman decoder 672, Inverse Quantizer 674, Inverse DCT 676, Motion Compensation 678 and adder 680, which function as described above in connection with the video decoder of FIG. 1. An internal processor 670 oversees the video decode process and, in accordance with the principles of the present invention, receives a signal from a host system whenever the host desires to switch the video display between, for example, normal video display and scaled video display. This signal is referred to in FIG. 6 as a "host controlled format change" signal. In response to host format changes, control signals are sent from internal processor 670 to Huffman decoder 672, Inverse Quantizer 674, Motion Compensation 678, as well as to upsample logic 694, display fetch unit 692 and display mode switch logic 696 within video display 690. Again, these control signals direct the video decode system in accordance with the principles of the present invention (and as described below) to switch the display output between, for example, normal video mode and scaled video mode.

Full size macroblocks of decoded video data are sequentially output from video decoder 654 to decimation unit 682 where, in one embodiment, the full size macroblocks undergo one of two types of compression. First, if full size video is desired, then decimation of the B-coded pictures only is preferably performed. In this normal video mode, decimation is a process of reducing the amount of data by interpolating or averaging combined values to get an interpolated pixel value. Interpolation reduces the number of pixels, and therefore, less external memory is required in the overall system. In a second mode, decimation unit 682 performs picture scaling in accordance with the principles of this invention. By way of example, the type of scaling employed may reduce the overall size of the display picture by a factor of 2 or 4 in both the horizontal and vertical axis.

Along with providing decimation unit 682 with a stream of decoded full-size macroblocks, video decoder also sends a "motion compensation unit block complete" signal on line 683, which lets decimation unit 682 know when a macroblock has been completely decoded. Similarly, decimation unit 682 provides a "decimator busy" signal on line 685 to motion compensation unit 678 of video decoder 654. This "decimator busy" signal informs the motion compensation unit when the decimation unit is busy and when the unit has completed its operations, after which the motion compensation unit can proceed to the next macroblock.

Motion compensation unit 678 of video decoder 654 provides read video addresses directly to memory control unit 652, and write video addresses to decimation unit 682 for writing of decoded video data (full size) and/or scaled macroblocks to external memory 653. In parallel with the read video address and write video address, pointers are provided by frame buffer pointer control 686 to the memory control unit. These pointers define which frame buffer areas within SDRAM 653 are to be accessed by a given read video address or write video address in accordance with the partitionings of the frame buffer memory space pursuant to this invention (as described further below). These pointers are referred to in FIG. 6 as current pointer and current small pointer, with current pointer comprising a pointer for a full size macroblock, and current small pointer comprising a pointer for a scaled macroblock.

Decimation unit 682 receives the decoded full size macroblocks, buffers the information internally and if scaling mode is activated, performs scaling as described below. In a normal mode, decimation unit 682 outputs decoded video data full-size macroblocks to memory control unit 652 for storage in frame buffers 653. When in scaling mode, decimation unit 682 scales the full-size macroblocks and outputs scaled macroblocks to memory control unit 652 for storage in frame buffers 653.

Frame buffer pointer control 686 is significant and controls rotation of the frame buffers, i.e., frame buffer assignments, when in normal video mode and video scaling mode in accordance with the principles of the present invention (described further below).

As described in the above-incorporated applications, decimation unit 682 also functions as part of video, display unit 690 when retrieving data for display. Specifically, decoded video data comprising full-size scan lines is retrieved from frame buffer storage 653 and fed through decimation unit 682 for B-frame re-expansion of pictures. This is done so that consistency is maintained for the video within a group of pictures, and thus reduced resolution of any one picture is not perceptible. After re-expansion, the full-size scan lines are provided to display output interface 698.

Alternatively, when in video scaling mode, decoded video comprising scaled scan lines is retrieved from frame buffer storage 653 and fed directly to scan line video buffers 684. The scan lines are divided between luminance and chrominance data and both a current scan line and a prior scan line are fed from scan line video buffers 684 to vertical and horizontal upsample logic 694. Upsample controls are received from display fetch unit 692, which coordinates letterbox formatting, SIF upsampling, 4:2:0 to 4:2:2 upsampling, and flicker reduction.

Display fetch unit 692 provides the read video address for retrieval of scan lines from frame buffer storage 653. A "current pointer, current small pointer" synchronization (sync) signal for display is received by memory control unit 652 from display mode switch logic 696 of video display unit 690. As noted above, the current pointer, current small pointer signal points to the particular frame buffer area from which scan lines are to be retrieved, while the read video address signal designates the particular scan lines to be retrieved within that frame buffer area.

Display mode switch logic 696 is provided in accordance with the principles of the present invention in order to ensure seamless switching between, for example, scaled video mode and normal video mode. Logic 696 receives as input a control signal from internal processor 670 of video decoder 654, as well as a vertical synchronization (VSYNC) signal (from display output interface 698) and a B picture "MPEG-2 repeat field" signal from Huffman decoder 672 of video decoder 654. VSYNC is an external synchronization signal that indicates the start of a new display field. Output from display mode switch logic 696, in addition to the current pointer, current small pointer sync for the display, is a "display format sync for display" signal fed to display fetch unit 692, as well as a "display format sync for decode" signal fed to the decode logic of decimation unit 682. Display mode switch logic 696 also outputs a "block video" signal to display output interface 698 which is employed, in accordance with the principles of the present invention, to block one display frame to keep noise from the display when switching between display modes. Video data is received at the display output interface from upsample logic 694. The decimation unit, frame buffer partitioning, frame buffer pointer control and display mode switch logic, all implemented in accordance with the principles of this invention, are described in greater detail below with reference to FIGS. 6a–10.

First, the frame buffers. The frame buffers are used to store the constructed pictures for display, as well as for prediction of subsequent pictures. Since a B picture is not used for prediction, its frame buffer is available for use after the picture has been displayed. For I or P pictures, the frame buffer needs to be held after display, particularly for predicting B pictures.

Figure 6A:
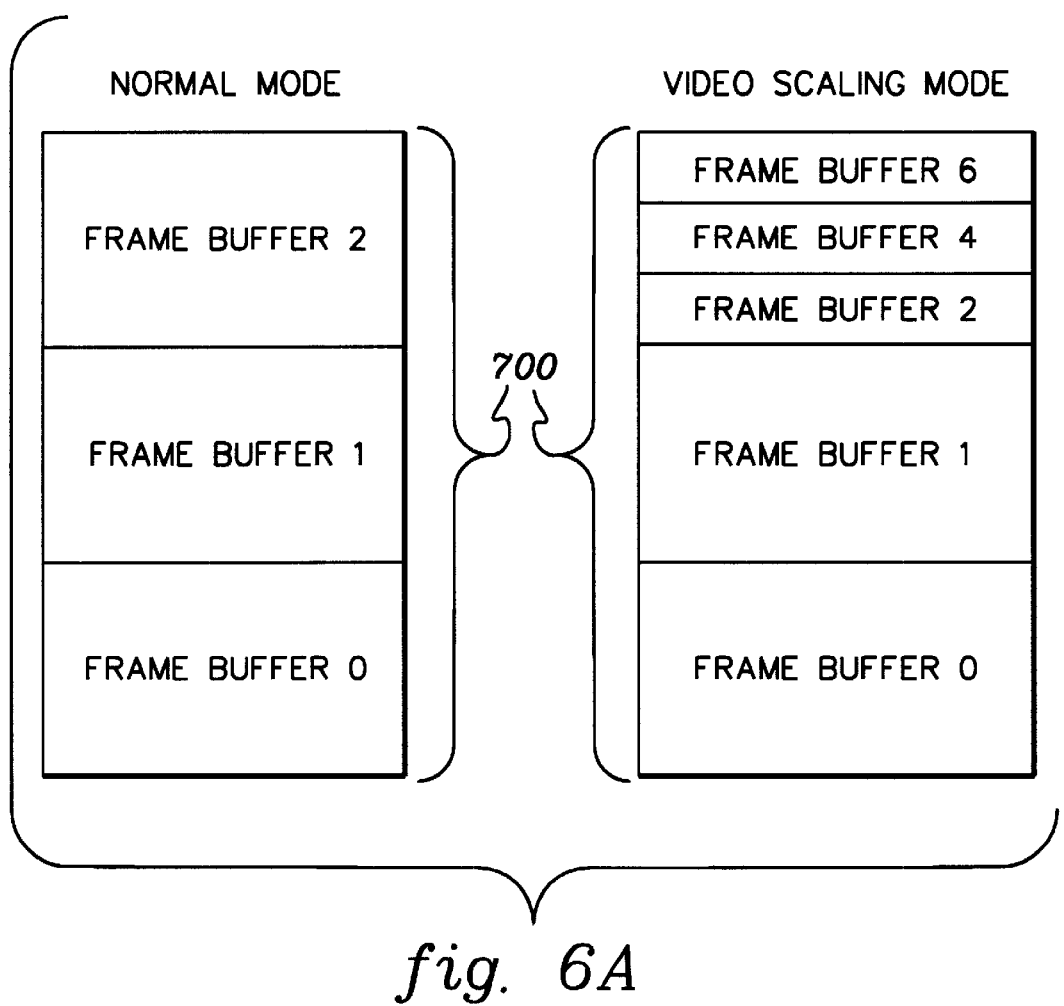
FIG. 6a illustrates frame buffer subdivision in a normal mode and in a video scaling mode in accordance with the present invention.

FIG. 6a depicts frame buffer 700 allocation for both normal video mode and scaled video mode in accordance with the principles of this invention. In normal mode, there are three frame buffers to support the decoding and display processes. Frame buffer 0 and frame buffer 1 are allocated for I and P pictures, while frame buffer 2 is assigned to B pictures. The frame buffers are tagged by buffer pointers, i.e., the current pointers from frame buffer pointer control 686 of FIG. 6.

In the scaled video mode, at least five frame buffers are employed. Frame buffer 0 and frame buffer 1 again accommodate full size I and P picture video. The at least three other buffers, which are labeled frame buffer 2, frame buffer 4 and frame buffer 6 in the example shown, are tagged by small pointers generated by the frame buffer pointer control. These small buffers are mainly used for display purposes when in scaled video mode. The buffers are small size in order to fit the video scalings. When decoding an I or P picture, the constructed picture is stored into either buffer 0 or buffer 1 depending upon whichever is available. At the same time, a scaled down version of the same picture is stored into one of the smaller buffers, i.e., frame buffer 2, frame buffer 4 or frame buffer 6. The full size video is then used for prediction, while the small'sized video in the small frame buffers is used for display of the scaled down picture.

The frame buffers are configured by microcode during initialization of the video decode system. A memory base address is assigned to each frame buffer, and these memory base addresses are selected by the buffer pointers generated by frame buffer pointer control. The read and write video addresses refer to specific addresses within a selected frame buffer. Unless otherwise indicated, the term "frame buffer" is used herein below as inclusive of all frame buffer memory configured during initialization. "Frame buffer area" refers to one of the specific frame buffers depicted in FIG. 6a.

The video display operates in real time, and therefore, frame buffer pointers must be switched according to the VSYNC timing. Since decoding is always ahead of the display, a frame buffer must be made available to store the decoded picture. Therefore, the frame buffer pointers must be switched before decoding starts. To avoid the disturbance to the display frame buffer, a copy of the display buffer pointer is maintained. The buffer switching time is at the beginning of each picture decode. The display buffer pointer is also changed at that time, however, it will not be used until copy display pointer time which is the beginning of picture display. One embodiment of normal mode buffer pointer rotation is described below.

The following assumes four buffer pointers, with each pointer containing two bits to indicate which one of the three frame buffers (buffer s, 1 and 2) is being accessed.

current pointer—indicates the frame buffer to be used for the constructing picture;

display pointer—indicates the frame buffer to be used for the display;

future pointer—indicates the frame buffer to be used for the backward prediction; and past pointer—indicates the frame buffer to be used for the forward prediction.

At startup, the future pointer is initialized to "1" and the other pointers are set to "0". At the beginning of an I or P picture decode, the value from the past pointer is loaded into the current pointer and the value from the future pointer is loaded into the display pointer. The values in the future pointer and the past pointer are swapped. If the decoding picture is a B picture, the current pointer and the display pointer are set to "2". Frame buffer 2 is reserved, in one example, for the B pictures. The future pointer and past pointer remain unchanged. Pointer switching in normal mode is described in greater detail in U.S. Pat. No. 5,668,599 by Cheney et al., entitled "Memory Management For An MPEG-2 Compliant Decoder," the entirety of which is hereby incorporated herein by reference.

Figure 7A:
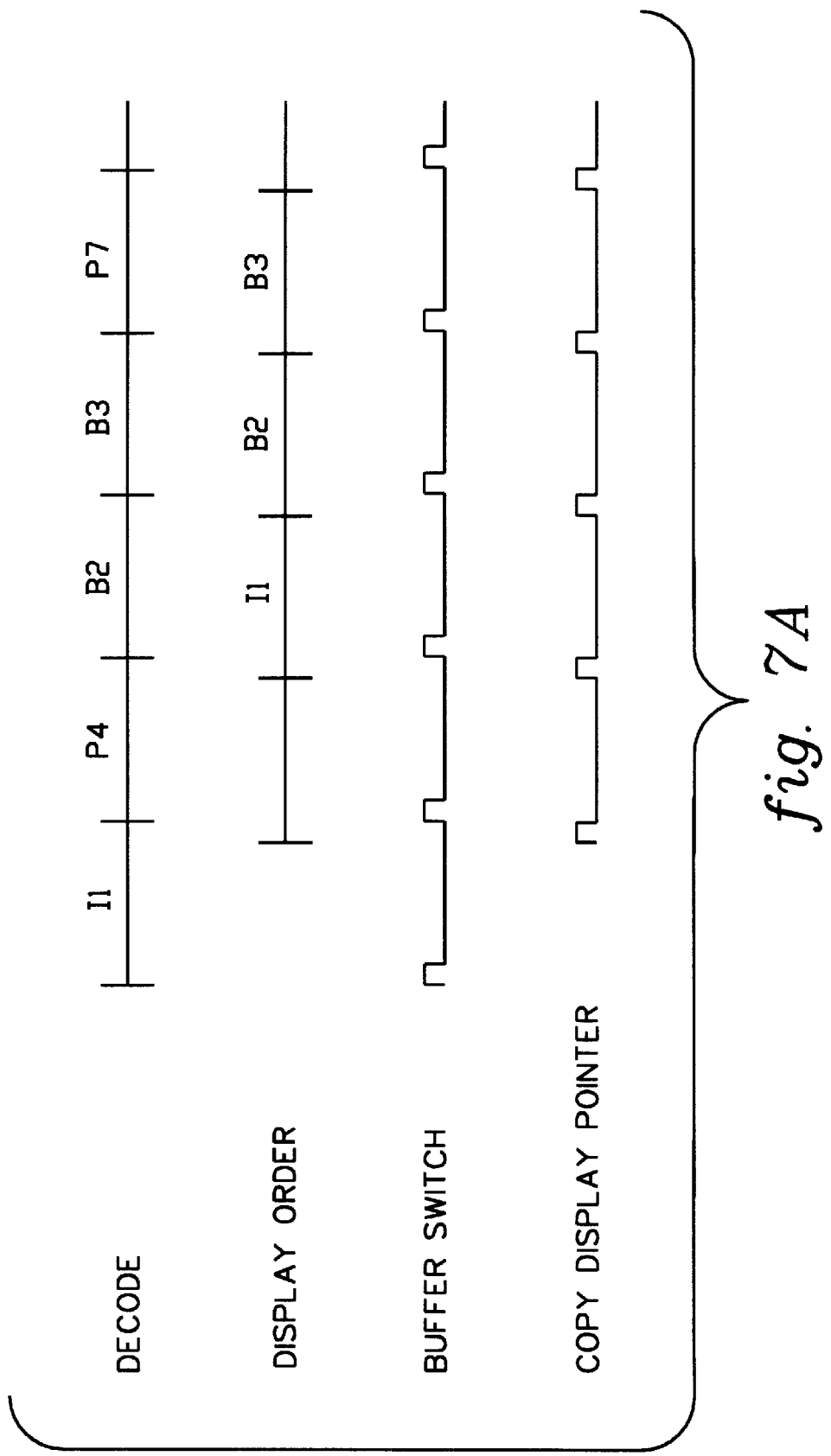
FIG. 7a is a timing diagram showing delayed display timing in a video scaling mode in accordance with the principles of the present invention.

In scaled video mode, the display time of a picture is delayed by an additional field time in accordance with the present invention. The purpose of this delay is to decouple the decode and the display processes so that the decoded scaled video can be placed anywhere on the screen. FIG. 7a depicts one example of the delayed display timing in scaled video mode. This display timing is adjusted dynamically according to the mode, i.e., whether normal mode or scaled video mode. The one field time delay is needed in accordance with this invention to properly manage the buffers. At least five buffers are again assumed in the video scaling mode. As described above, two of these five buffers comprise full-size frame buffers, and are labeled frame buffer 0 and frame buffer 1 in FIG. 6a. These full-size frame buffers are the same as the corresponding buffers used in normal video mode. The at least three small frame buffers, i.e., frame buffer 2, frame buffer 4 and frame buffer 6, are allocated in the same memory space occupied by frame buffer 2 used in the normal video mode. These three small frame buffers are controlled by a different algorithm than described above.

Specifically, four additional pointers are used in scaled video mode. These pointers are:

small current pointer—indicates a small buffer for the decimated constructing picture;

small display pointer—indicates a small buffer for the display;

small future pointer—indicates the small buffer for the future display; and small transition pointer—indicates the small buffer for the transition.

When the decoder is initialized, the small current pointer, small display pointer, small future pointer and small transition pointer are set to 0, 2, 4 and 6, respectively. At the start of each picture decoding, the small current pointer is loaded from the small transition pointer and the small transition pointer is loaded from the small display pointer. If the decoding picture is a B picture, then the small display pointer is loaded from the small transition pointer and the small future pointer remains unchanged. If the decoding picture is an I or P picture, the small display pointer is loaded from the small future pointer and the small future pointer is loaded from the small transition pointer. One example of small frame buffer switching in accordance with the present invention is depicted in FIG. 7b.

The full-size frame buffers, frame buffer 0 and frame buffer 1, are switching as if the decoder is running in normal mode. These two buffers are needed for prediction, but are not for display in scaled video mode. When an I or P picture is being decoded, the picture is stored in both buffers indicated by the current (full frame) pointer and the small current pointer. During a B picture decoding, frame buffer 2 indicated by the current (full frame) pointer will not be used. Only the small frame buffer identified by the small current pointer is used for the decimated picture. In normal mode, the display pointer is used for display, while in scaled video mode, the small display pointer is used. The two buffer switching algorithms operate; simultaneously at the beginning of each picture decoding. The buffer pointers are simply selected depending upon which mode the decoder is in.

Figure 8:
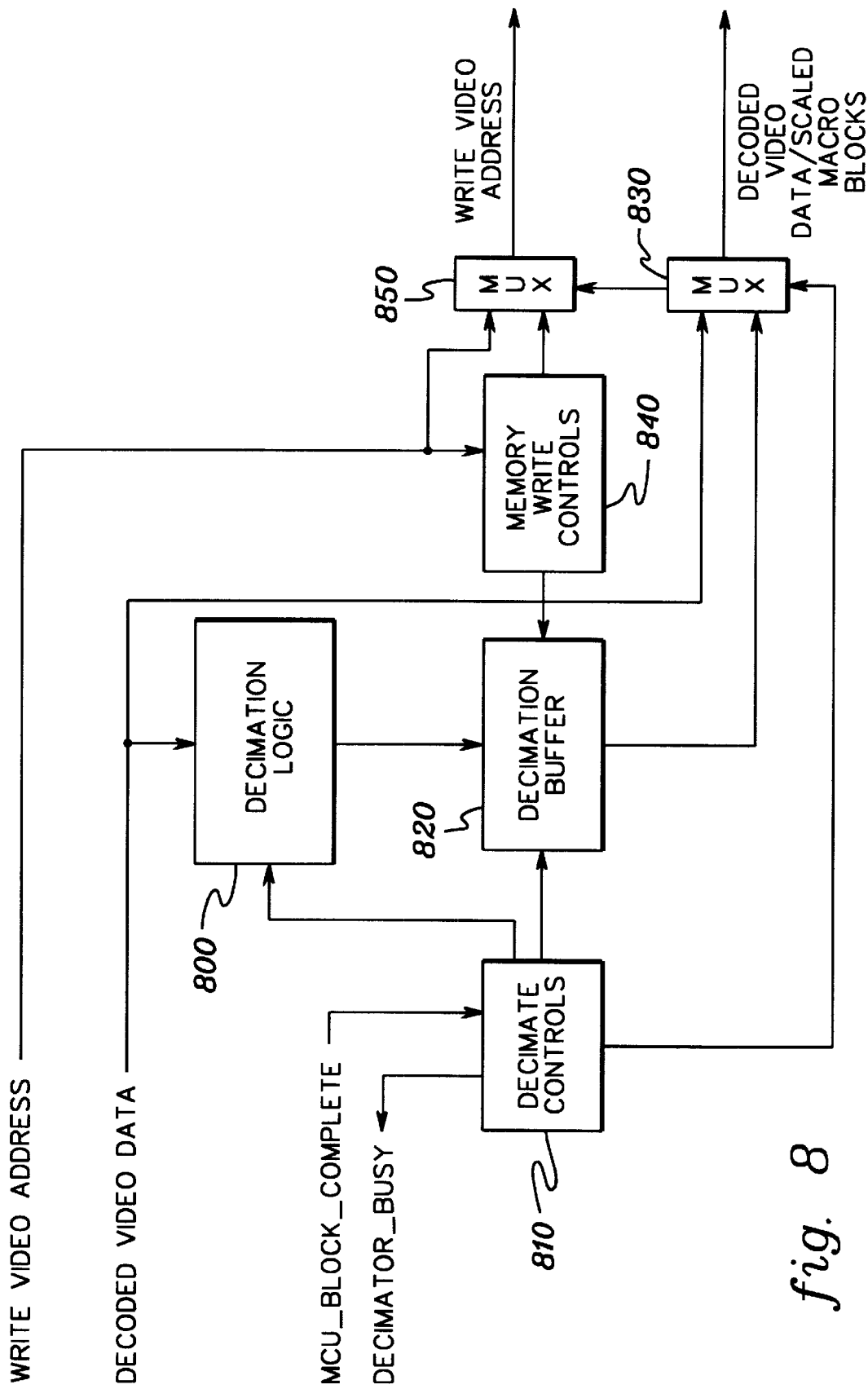
FIG. 8 is a block diagram of one embodiment of a decimation unit in accordance with the principles of the present invention for the video decode system of FIG. 6.

Next, FIG. 8 depicts one embodiment of a decimation unit 682 (FIG. 6) employed in accordance with the present invention.

In previous implementations of the decode decimation unit, e.g., the decimation unit was limited to operating on B pictures only, for either letterbox or memory reduction purposes. In a scaled video mode as presented herein, however, the decode decimation unit processes all picture types. This is desirable in order to save memory bandwidth at display time, since (in one embodiment) scaled pictures and multi-plane, high resolution OSD graphics may be mixed at the output.

In the embodiment of FIG. 8, the decimation unit includes decimation logic 800, which receives the decoded video data from the video decoder and outputs a decimated data flow to a decimation buffer 820. Output from decimation buffer 820 is multiplexed 830 with the undecimated, decoded video data received from the video decoder such that multiplexer 830 outputs the decoded video data, as well as the scaled macroblocks for storage in frame buffers 0, 1, 2, 4 and 6 as described above when in scaled video mode. The write video address from the motion compensation unit of the video decoder is fed to memory write controls 840 within the decimation unit, which control writing of data from decimation buffer 820. The write video addresses, either with or without decimation scaling, are also output through a multiplexer 850 to the memory control unit (see FIG. 6).

Multiplexers 830 & 850 are controlled by decimate control signals 810. The decimate control logic receives as input a signal called "MCU_block_complete" from the motion compensation unit of the video decoder. This signal indicates when the decimator can begin to write the scaled macroblock. The decimator informs the motion compensation unit that it is currently busy through a signal labeled "decimator_busy".

For a given macroblock, there are two phases. One phase is for the luminance, and the other phase is for chrominance. Each phase requires a write of one full-sized macroblock and one scaled macroblock, again, assuming scaled video mode.

Various specific changes to the decimation hardware/process described previously are intended herein. One change in the data flow of the decimation process is the addition (in one example) of a 4 to 1 horizontal reduction, which is implemented in the horizontal decimate function of the decimation logic. This is to support 1/16 size scaling.

Another change is to increase the decimation buffer size to 32×32 bits. As I and P pictures are processed, the full-sized macroblock is written to memory, while the decimator scales down the macroblock at the same time and stores a small macroblock in the decimation buffer 820. After the full-sized macroblock is written to memory, the decimator writes the scaled macroblock to another buffer location within memory (i.e., frame buffer 2 frame buffer 4 or frame buffer 6 in the example above). The larger decimation buffer allows for the storing of the small macroblock.

The decimate state machine logic is also changed to allow two modes of operation, i.e., again assuming a scaled video mode. The first mode is B picture processing and the second mode is reference picture processing. For B picture processing, only the small macroblocks are written to memory throughs decimation buffer 820. The data is paced through the decimation unit as fast as the motion compensation unit can deliver it, since the decimation buffer can hold a complete scaled macroblock. For reference picture operations, the full size macroblocks are written to memory first through multiplexer 830, followed by the writing of the scaled macroblocks. This requires the data flow to be paced by the memory control unit responding to requests for writing.

Since the size of the source compressed image may vary, there are exceptions to the above process. The decimator is only required if some type of reduction is needed to form a scaled picture. Certain video sources will already be small in size, and one dimension, or both dimensions may not require scaling. For example, it is common to have 352×240 sized images (typical MPEG-1 size). In this case, it would be unnecessary to do any decimation to provide a ¼ scaling. For reference frames, the motion compensation unit is required to write the full-sized macroblock to the reference frame buffer in memory, and then to the display frame buffer in memory, since the display process is only operating on the display frame buffer during scaling.

For the same image size to be reduced to 1/16 scaling, there would need to be a decimation step. Once again, there is an exception in this case.

One of the objects of the scaling feature is to remove interlacing artifacts. On true MPEG-1 images, there is no interlacing since the pictures are exclusively frame encoded. MPEG-2 can allow interlaced pictures of the same resolution (352×240) and the decimator only uses the top field picture to create the scaled macroblock. The bottom field is discarded. Therefore, for a reference picture, the MCU would be required to write the macroblock for the top field picture to both the reference frame buffer and display buffer. For B pictures, the MCU would only need to write the top field picture into the display frame buffer.

The video decode system in accordance with the present invention provides smooth transitions when entering and exiting small picture mode. Since frame buffer 2 is used for capture and display of small picture images (including reference and B pictures) when in video scaling mode, care must be taken to prevent interference between the decode and display processes at the time of display format switching. Also, there is a latency adjustment of one field time that must take place during the transition. Normal display modes have a 1.5 frame latency between decoding and displaying reference pictures, and a 0.5 frame latency for B pictures. In small picture mode, the reference frame latency is changes to two frames and the B frame latency is changed to one frame.

For the display format change to occur seamlessly, the display must not be in the process of displaying a B picture when the transition occurs, otherwise the picture will appear disturbed. Therefore, transition must take place when a reference picture is being displayed. This is forced to happen by the microcode during a sequence header, when the first frame of the new sequence is a reference frame, and the display is acting on the last frame of a previous sequence.

During the transition into and out of small picture mode, the hardware must make the adjustment in latency without disturbing the decode or display process. Frame sync must be adjusted to the new mode. Further, field parity must be maintained. As a result of making the adjustment into small picture mode, a delay of one frame time is introduced, which may effect PTS comparison. Subsequently, a skipped frame may be required in order to make up the time difference. This only occurs when entering small picture mode. When leaving small picture mode, there is no loss of synchronization. The transition could also come at a time when a picture is already being skipped or repeated.

Figure 9:
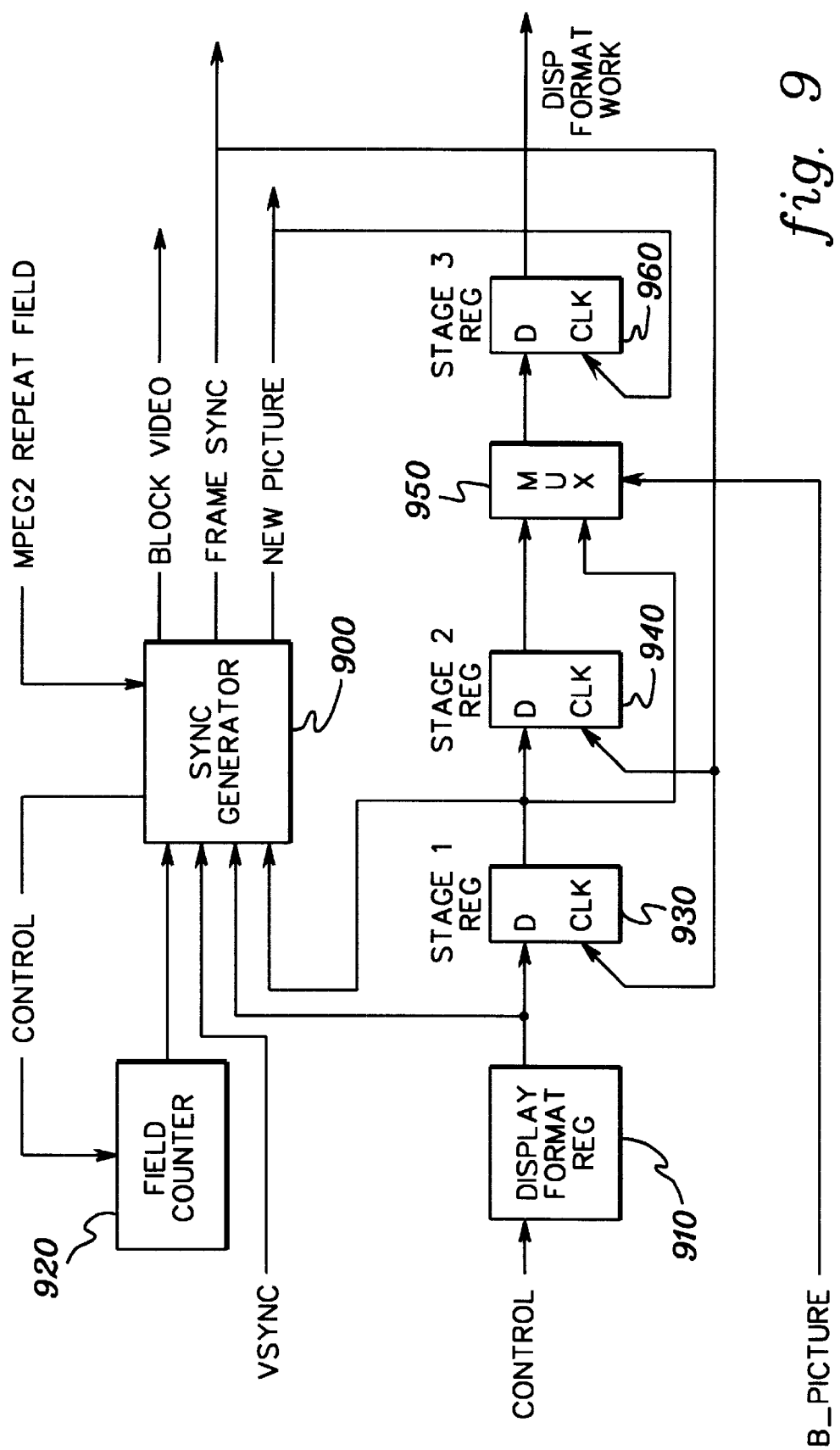
FIG. 9 is a block diagram of one embodiment of display mode switch logic in accordance with the principles of the present invention for the video decode system of FIG. 6.

Referring to FIG. 9, the display format change signal is written asynchronously by the host. The format is received as a control signal into a display format register 910, and microcode waits until processing the sequence header before writing the information into display format register 910. This information is then seen by sync generator 900, as well as register stages 930, 940 and 960. Register stage 1 930 captures the information at the next frame sync. Decode processes use the stage 1 register 930, and the display processes use the stage 3 register 960.

Field counter 920 simply counts down from a starting number of fields in a frame to a value of 1, and then repeats. Counter 920 is loaded by sync generator 900 via a control signal as shown. Sync generator 900 also receives the VSYNC signal, as well as the output of stage 1 register 930. Sync generator 900 creates three signals, namely, a "frame sync" signal, a "new picture" signal and a "block video" signal. The "frame sync" signal indicates to the decode process when to begin decoding a new frame. The "new picture" signal indicates to the display process when to begin displaying a new frame. "Block video" is used to selectively suppress one frame of video image during transition of the video decode system from a normal frame to a scaled frame. The frame sync and new picture signals are pulses that are created once every two field times. In normal mode, the signals are 180° out of phase, but in scaling mode (in accordance with this invention) the signals are in phase. This is described further below in connection with the flowchart of FIG. 10.

In all cases involving a switch into scaled picture mode, there is a repeated frame which is blocked from view at the display. The block is necessary due to buffer conflicts between the current reference frame and the reference frame that is currently being displayed. When video is blocked, the output of the decoder can be forced to a background color, such as black.

The latency adjustment is performed as soon as the stage 1 register changes. There is an absence of a frame sync which allows the current display frame to be scheduled to repeat. The sync generator then adjusts the frame sync to occur in phase with the new picture, causing the latency adjustment. During the repeated reference frame, the video is blocked for one frame time.

Figure 10:
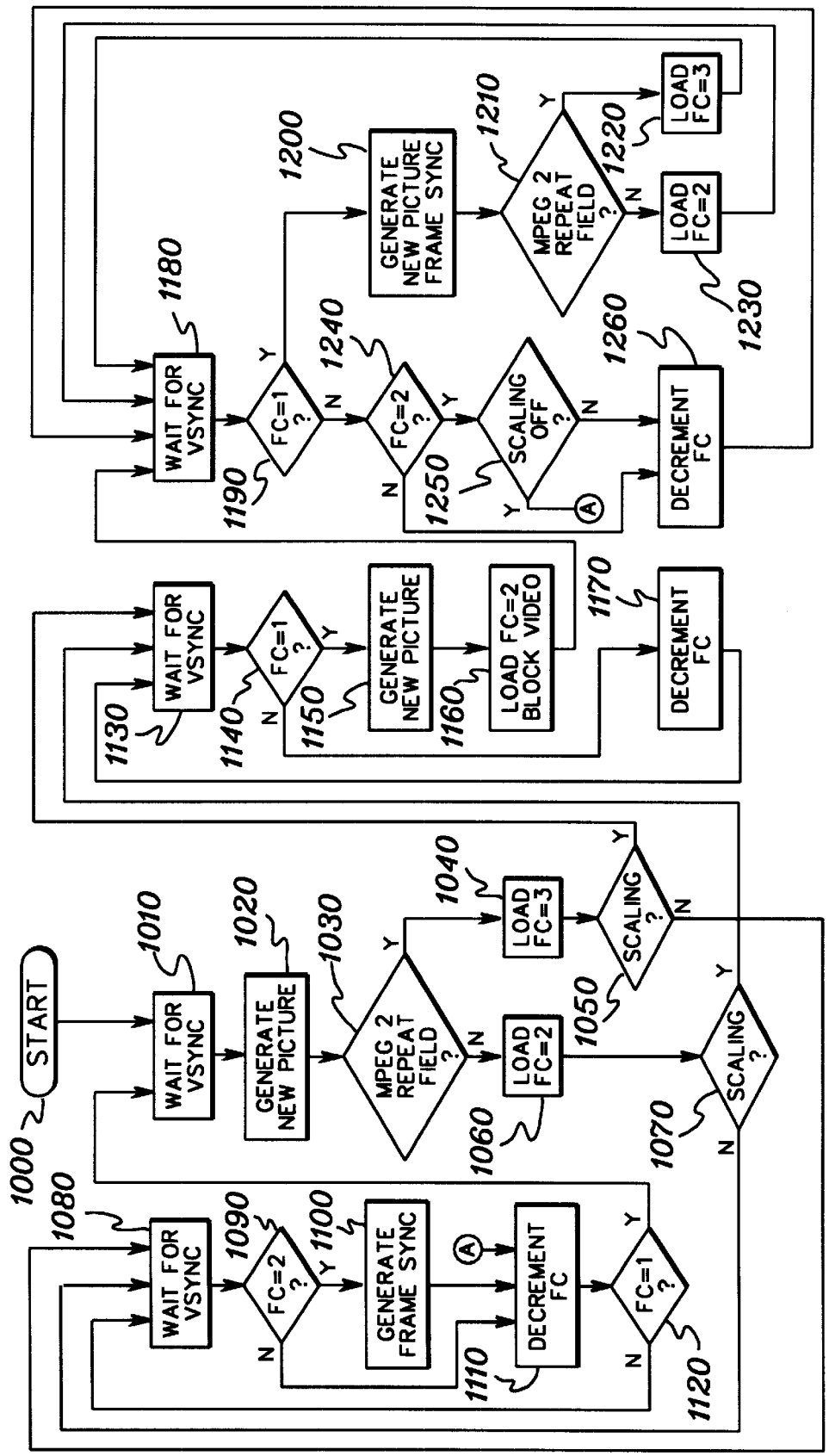
FIG. 10 is a flowchart of one embodiment of processing implemented by the sync generator of FIG. 9 in accordance with the principles of the present invention.

FIG. 10 is a flowchart of one embodiment of processing implemented by sync generator 900 (FIG. 9).

With initiation 1000, processing waits for a VSYNC signal 1010 representative of the start of a new field. Upon receipt of the VSYNC signal, processing generates a "new picture" sync signal and inquires whether the field is being repeated based on received MPEG-2 syntax 1030. The initial field counter (FC) value depends upon whether the field is to be repeated. If 3:2 pulldown is employed then the initial value of the field counter is 3 1040, otherwise normal interlace is desired and the field counter is loaded with a value of 2.

Once the field counter is set, processing inquires whether scaling is to be implemented 1050 and 1070, respectively. If no, then the decode system is in non-scaling or normal video mode. In this case, processing waits for a next VSYNC signal 1080 and then inquires whether the field count equals two 1090. If no, (e.g., because the field counter was loaded with a value 3), the field counter is decremented 1110 and processing waits for a next VSYNC signal 1080. Once the field count equals 2, the "frame sync" signal is generated 1100, after which the field count is decremented 1110 and processing determines whether the field count value now equals 1 1120. If the value equals 1, processing generates a "new picture" signal 1120 after waiting for a new VSYNC 1010.

Assuming scaling mode is desired, then processing proceeds from inquiry 1050 or 1070 to wait for a next VSYNC 1130, after which determination is made whether the field count equals 1 1140. If no, the field counter is decremented and processing returns to wait for a next VSYNC 1130. If the field count value is 1, then a new picture sync signal is generated 1150. Thereafter, the field counter is loaded with a value of 2 and the block video signal is generated 1160. Again, the block video signal is output from the sync generator to the display output interface (see FIG. 6) for blocking of a next frame of video.

After sending the block video signal, processing enters a steady state, video scaling subprocess beginning by waiting for a next VSYNC signal 1180, after which processing determines whether the field count equals 1 1190. If no, processing inquires whether the field count equals 2 1240, and again if no, processing decrements the field counter 1260 and returns to wait for the next VSYNC signal 1180. Otherwise, a determination is made as to whether the scaling command has now been turned off by the host system 1250. If no, the field counter is decremented and processing waits for a next VSYNC signal 1180. If the scaling mode has been switched off, then the field counter is decremented at instruction 1110 in the non-scaling process described above.

If the field count equals 1 at inquiry 1190, then processing generates both the "new picture" signal and the "frame sync" signal in the same phase. Again, to implement scaling it is necessary to change the latency between the decode process and the display process from one and a half frame times to two frame times for reference pictures, making the new picture signal and frame sync signal in phase. Processing then determines whether the MPEG-2 repeat field is set 1210 to decide whether to load the field counter with a value of 2 1230 or 3 1220 depending upon whether normal interlacing or 3:2 pulldown is desired. This is necessary even though an adjustment in latency is made in order to accommodate any type of frame rate conversion. After setting the field counter, processing returns to wait for a next VSYNC signal 1180.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for forming a multi-screen display for a non-picture-in-picture television system, said method comprising:

receiving, from a first input source, and decoding a compressed digital video signal to produce a decompressed digital video signal;

receiving, from a second input source, an uncompressed video signal; and merging the decompressed digital video signal and uncompressed video signal to produce a single multi-screen display signal for said television system, thereby providing said non-picture-in-picture television system with the capability to display multiple pictures simultaneously.

2. The method of claim 1, further comprising downscaling said decompressed digital video signal prior to merging thereof with said uncompressed video signal, said downscaled decompressed digital video signal comprising at least one screen of said multi-screen display.

3. The method of claim 2, wherein said uncompressed video signal comprises an uncompressed analog video signal.

4. The method of claim 1, wherein said merging comprises switching between said decompressed digital video signal and said uncompressed analog video signal to create at least some video frames for display by said television system, said switching creating said multi-screen display.

5. The method of claim 1, further comprising blending on-screen display (OSD) graphics with at least one of said decompressed digital video signal, said uncompressed video signal, and said multi-screen display comprising said decompressed digital video signal and said uncompressed video signal.

6. The method of claim 1, further comprising implementing said method within at least one of a digital video set-top box (STB) or a digital video disc player.

7. The method of claim 1, wherein said compressed digital video signal is received from a first video source, and said uncompressed video signal is received from a second video source.

8. A method for processing an analog video signal comprising:

digitizing the analog video signal for input to a digital video processing system;

blending within the digital video processing system the digitized video signal with on-screen display (OSD) graphics; and implementing said method within at least one of a digital video set-top box (STB) or a digital video disc player, and formatting said blended digitized video signal and OSD graphics for display by an analog television system.

9. The method of claim 8, wherein said digitizing is performed within a digital multi-standard decoder, and wherein said digital video processing system comprises an integrated digital video decode system.

10. A system for forming a multi-screen display for a non-picture-in-picture television system, said system comprising:

a video decoder for decoding a compressed digital video signal from a first video source and producing therefrom a decompressed digital video signal;

an input for receiving into said video decoder an uncompressed video signal from a second video source; and said video decoder being adapted to merge said decompressed digital video signal and said uncompressed video signal to produce a multi-screen display signal for said television system, thereby providing said non-picture-in-picture television system with the capability to display multiple pictures simultaneously.

11. The system of claim 10, wherein said video decoder is further adapted to downscale said decompressed digital video signal prior to merging thereof with said uncompressed video signal, said downscaled decompressed digital video signal comprising at least one screen of said multi-screen display.

12. The system of claim 11, wherein said uncompressed video signal comprises an uncompressed analog video signal, and wherein said system further comprises a digital multi-standard decoder for digitizing said uncompressed analog video signal prior to input thereof to said video decoder.

13. The system of claim 10, wherein said video decoder is further adapted to switch between said decompressed digital video signal and said uncompressed analog video signal to create at least some video frames for display by said television system in picture-in-picture format.

14. The system of claim 10, wherein said video decoder is further adapted to blend on-screen display (OSD) graphics with said multi-screen display signal prior to presentation to said television system.

15. The system of claim 10, wherein said system comprises one of a digital video set-top box (STB) or a digital video disc (DVD) player.

16. A system for forming a multi-screen display for a non-picture-in-picture television system, said system comprising:

means for receiving, from a first input source, and decoding a compressed digital video signal to produce a decompressed digital video signal;

means for receiving, from a second input source, an uncompressed video signal; and means for merging the decompressed digital video signal and uncompressed video signal to produce a single multi-screen display signal for said television system, thereby providing said non-picture-in-picture television system with the capability to display multiple pictures simultaneously.

17. A system for processing an analog video signal comprising:

a digital video processing system;

a digital multi-standard decoder for digitizing the analog video signal for input to said digital video processing system;

said digital video processing system being adapted to blend the digitized video signal with on-screen display (OSD) graphics for output as a blended video signal; and wherein said system comprises at least one of a digital video set-top box (STB) or a digital video disc (DVD) player, and said digital video processing system is adapted to format said blended digitized video signal and OSD graphics for display by an analog television system.

18. The system of claim 17, wherein said digital video processing system comprises a video decoder, said video decoder being adapted to perform said blending of said digitized video signal with said OSD graphics.

19. A system for processing an analog video signal comprising:

means for digitizing the analog video signal for input to a digital video processing system;

means for blending within the digital video processing system the digitized video signal with on-screen display (OSD) graphics; and means for implementing said system within at least one of a digital video set-top box (STB) or a digital video disc player, and means for formatting said blended digitized video signal and OSD graphics for display by an analog television system.

20. An article of manufacture comprising:

a computer program product comprising computer usable medium having computer readable program code means therein for forming a multi-screen display for a non-picture-in-picture television system, said computer readable program code means in said computer program product comprising:

computer readable program code means for causing a computer to effect decoding a compressed digital video signal, received from a first input source, to produce a decompressed digital video signal;

computer readable program code means for causing a computer to effect receiving, from a second input source, an uncompressed video signal; and computer readable program code means for causing a computer to effect merging the decompressed digital video signal and uncompressed video signal to produce a multi-screen display signal for said television system, thereby providing said non-picture-in-picture television system with the capability to display multiple pictures simultaneously.

21. An article of manufacture comprising:

a computer program product comprising computer usable medium having computer readable program code means therein for processing an analog video signal, said computer readable program code means in said computer program product comprising:

computer readable program code means for causing a computer to effect digitizing the analog video signal;

computer readable program code means for causing a computer to effect blending the digitized video signal with on-screen display (OSD) graphics for presentation to a television system; and computer readable program code means for causing a computer to effect formatting said blended digitized video signal and OSD graphics for display by an analog television system, wherein said computer program product is for at least one of a digital video set-top box (STB) or a digital video disc player.

* * * * *